United States Patent [19]

Fung

[11] Patent Number: 5,949,410
[45] Date of Patent: Sep. 7, 1999

[54] APPARATUS AND METHOD FOR SYNCHRONIZING AUDIO AND VIDEO FRAMES IN AN MPEG PRESENTATION SYSTEM

[75] Inventor: Hei Tao Fung, Campbell, Calif.

[73] Assignee: Samsung Electronics Company, Ltd., Seoul, Rep. of Korea

[21] Appl. No.: 08/733,437

[22] Filed: Oct. 18, 1996

[51] Int. Cl.[6] .................................................. G06T 1/00
[52] U.S. Cl. ............................ 345/302; 348/12; 348/13
[58] Field of Search ................................... 345/302, 328, 345/330, 213; 348/12, 13, 15, 8, 4; 379/88.13, 158; 707/516

[56] References Cited

U.S. PATENT DOCUMENTS

| | | |
|---|---|---|
| 5,278,647 | 1/1994 | Hingorani et al. . |
| 5,434,913 | 7/1995 | Tung et al ............................... 379/202 |
| 5,488,570 | 1/1996 | Agarwal .................................. 364/514 |
| 5,510,842 | 4/1996 | Phillips et al. . |
| 5,576,765 | 11/1996 | Cheney et al. . |
| 5,617,145 | 4/1997 | Huang et al. ........................... 348/423 |
| 5,668,599 | 9/1997 | Cheney et al. . |
| 5,729,279 | 3/1998 | Fuller . |

*Primary Examiner*—Joseph H. Feild
*Assistant Examiner*—Alford W. Kindred
*Attorney, Agent, or Firm*—Skjerven, Morrill, MacPherson, Franklin & Friel LLP; Ken J. Koestner

[57] ABSTRACT

Synchronization of MPEG audio and video presentations is attained by detecting a lack of synchrony between the data presentations and modifying the audio data stream based on the detected lack of synchrony. Synchrony of the MPEG audio and video presentations is monitored by tracking the amount of data transferred to audio and video interfaces over time. Synchronization of MPEG audio and video presentations is achieved in a system in which audio and video interfaces are controlled by separate and independent timing signal generators by tracking the amount of audio and video data output by the respective audio and video interfaces. The amount of audio and video data output by the interfaces is compared and, as a result of the comparison, the audio data stream is modified to restore synchrony. Alternatively, presentation of the video data stream is modified to achieve synchrony.

22 Claims, 12 Drawing Sheets

APPARATUS AND METHOD FOR SYNCHRONIZING AUDIO AND VIDEO FRAMES IN AN MPEG PRESENTATION SYSTEM

BACKGROUND OF THE INVENTION

1. Field of the Invention

The present invention relates to an MPEG audio/video decoder. More specifically, the present invention relates to an apparatus and operating method for synchronizing the presentation of audio and video frames.

2. Description of the Related Art

Standardization of recording media, devices and various aspects of data handling, such as audio recording, storage and playback, is highly desirable for continued growth of this technology and its applications. One compression standard which has attained wide spread use for compressing and decompressing video information is the moving pictures expert group (MPEG) standard for audio and video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition 1993-08-01 (hereinafter referred to as MPEG International Standard).

An MPEG decoding system receives compressed data and reconstructs the compressed data into data frames for presentation at appropriate presentation times. The decoding system models the delay between audio and video performance devices as a zero delay even though actual delays are imposed, variable between different devices, and may be extended by post-processing or output operations. Audio and video presentations are typically synchronized by displaying a video frame instantaneously at a scheduled presentation time. A first audio sample is presented instantaneously at the scheduled presentation time and subsequent audio samples are presented in sequence at an audio sampling rate.

The MPEG International Standard addresses the problem of combining one or more data streams from video and audio sources with timing information to form a single information stream. The presentation of audio frames and the presentation of video frames are related by system timing signals. The system timing signals produce synchrony between the audio frames and corresponding video frames so long as the audio and video frames are controlled by the same timer. However, in practice the audio presentation and the video presentation in a personal computer environment are typically controlled by two different timers so that a mismatch in frequency between the two timers is likely. After some duration of time has elapsed the frequency mismatch between the timers inevitably results in a loss of synchrony between the audio and video presentations.

What is needed is a technique for enforcing audio/video synchrony.

SUMMARY OF THE INVENTION

In accordance with an embodiment of the present invention, synchronization of MPEG audio and video presentations is attained by detecting a lack of synchrony between the data presentations and modifying the audio data stream based on the detected lack of synchrony. Synchrony of the MPEG audio and video presentations is monitored by tracking the amount of data transferred to audio and video interfaces over time. In an alternative embodiment, the video data stream is modified to achieve synchrony.

In accordance with one aspect of the present invention, synchronization of MPEG audio and video presentations is achieved in a system in which audio and video interfaces are controlled by separate and independent timing signal generators by tracking the amount of audio and video data output by the respective audio and video interfaces. The amount of audio and video data output by the interfaces is compared and, as a result of the comparison, the audio data stream is modified to restore synchrony. In an alternative embodiment, the video data stream is modified to achieve synchrony.

Many advantages are achieved by the described synchronization system and operating method. One advantage is that synchrony is achieved between data streams having timing governed by independent timing sources. Another advantage is that synchrony is achieved using simple data manipulation operations. It is advantageous that synchrony is maintained with only slight imperfections in the performance signals.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Operations of multimedia applications including MPEG1, MPEG2, video conferencing, fax support, modem support and the like are efficiently performed using a multiple processor system. One example of a multiprocessor system includes a scalar processor and a vector processor.

Figure 1:
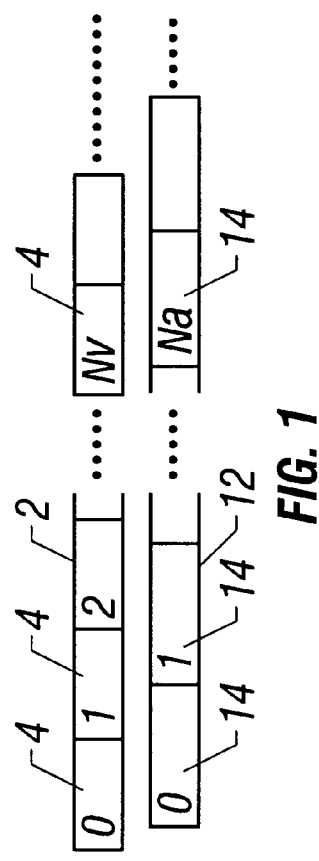
FIG. 1 is a timing diagram which illustrates the timing of a video presentation and an audio presentation operating in synchrony.
Figure 2A:
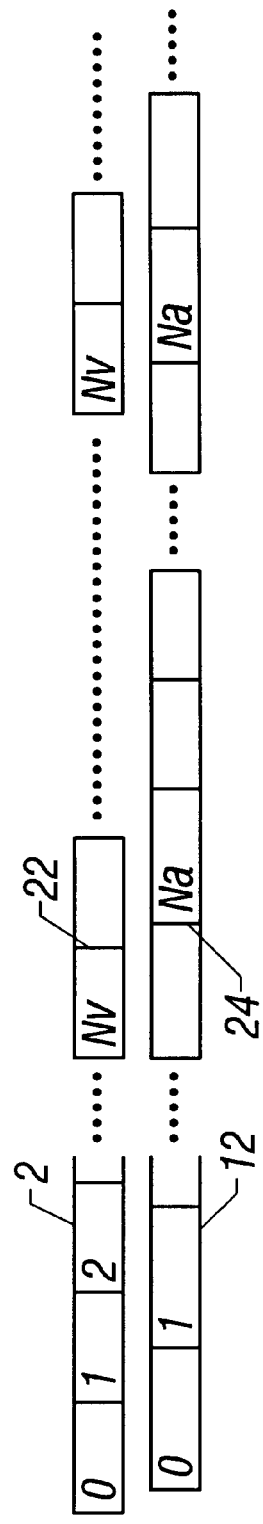
FIGS. 2A and 2B are timing diagrams illustrating a first embodiment of a technique for detecting and enforcing synchrony for an audio signal which lags a video signal and an audio signal which leads a video signal, respectively.
Figure 2B:
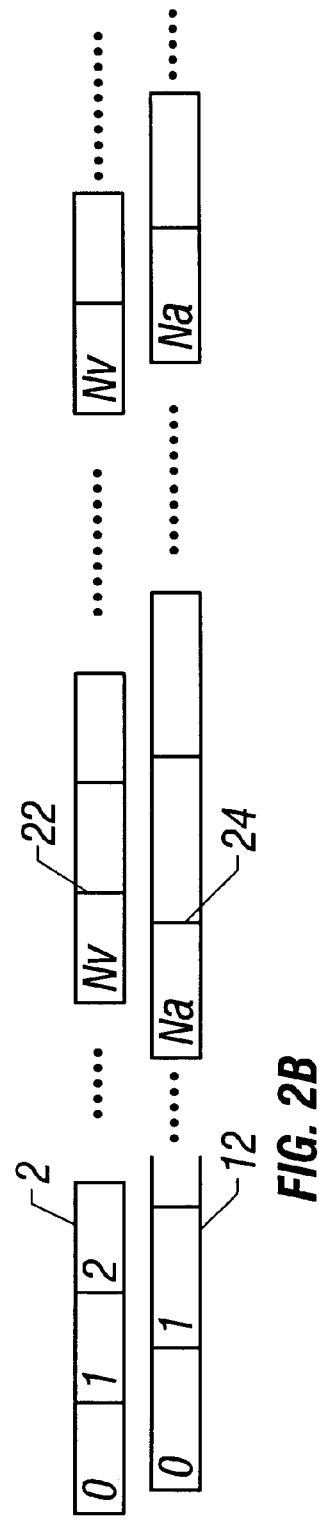

Referring to FIG. 1, a timing diagram illustrates the timing of a video presentation 2 and an audio presentation 12 operating in synchrony. While the presentations are in synchrony, a one-to-one correspondence exists between the individual video frames 4 and the individual audio frames 14. FIGS. 2A and 2B are timing diagrams illustrating a first embodiment of a technique for detecting and enforcing synchrony. In this first embodiment technique, timing of the audio presentation 12 is manipulated to match the timing of the video presentation 2. When the audio presentation 12 lags the video presentation 2, as shown in FIG. 2A, the duration of the audio presentation 12 is abbreviated. When the audio presentation 12 leads the video presentation 2, illustrated by FIG. 2B, the duration of the audio presentation 12 is extended.

Figure 3:
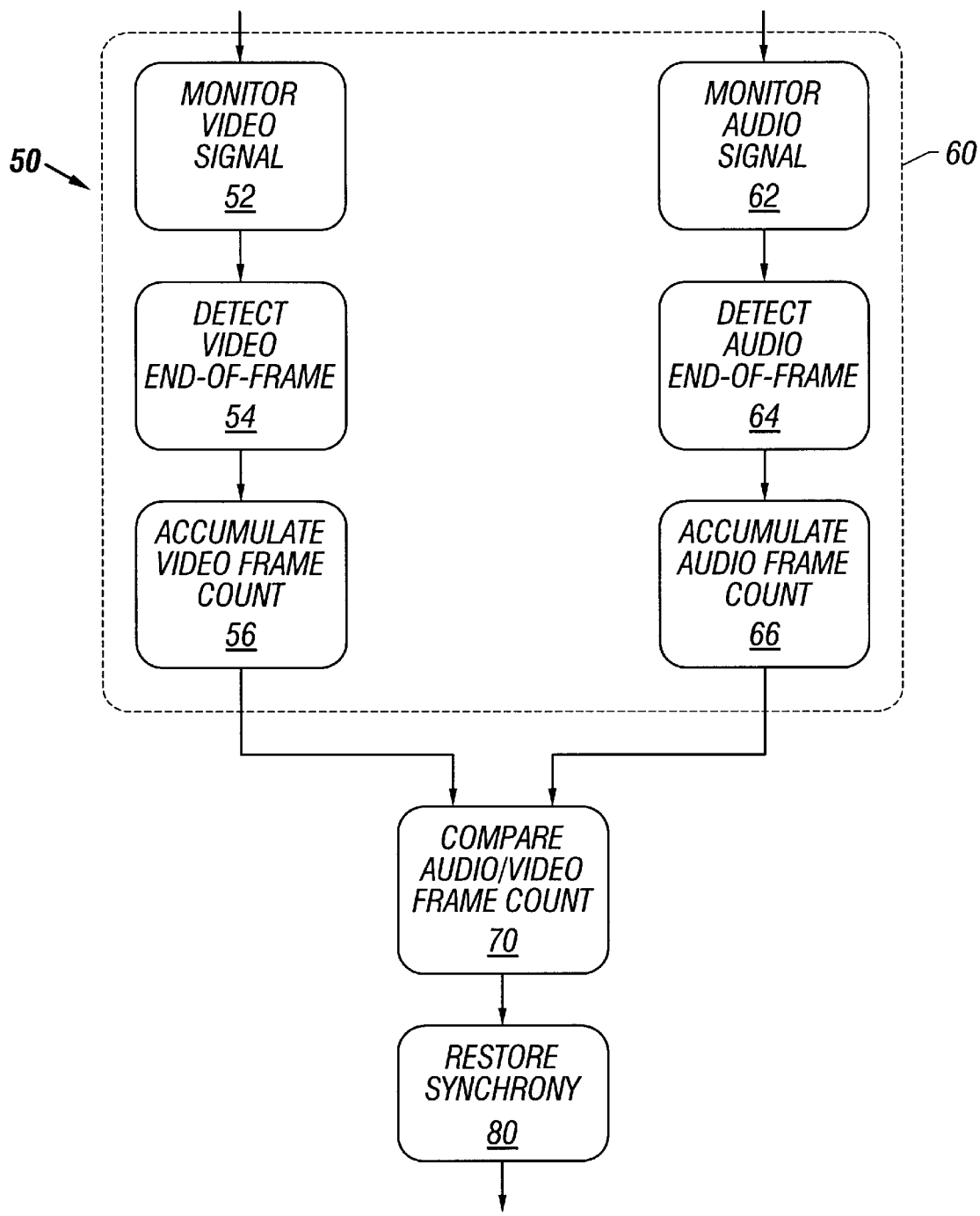
FIG. 3 is a flow chart showing a procedure for detecting and enforcing synchrony between an audio presentation and a video presentation.

Referring to FIG. 3 in conjunction with FIGS. 2A and 2B, a flow chart illustrates a procedure for detecting and enforcing synchrony 50 between the audio presentation 12 and the video presentation 2. The procedure for detecting and enforcing synchrony 50 includes a detect asynchrony subprocedure 60 for detecting when the audio presentation 12 and the video presentation 2 are out of synchrony and a restore synchrony subprocedure 80. The detect asynchrony subprocedure 60 includes an audio signal monitoring operation 62 and a video signal monitoring operation 52.

The video signal monitoring operation 52 in a detect video end-of-frame operation 54 determines when a video frame is displayed by detecting a video end-of-process (vEOP) signal 22. The vEOP signal 22 is generated by a DMA controller 224 in response to signals generated by a CODEC interface control block 906 such as a KS0119 Video Encoder (see FIGS. 6 and 12), when a video signal frame is output from an SDRAM memory 230. The vEOP signal 22 is available for tracking data transmission. An accumulate video frame count operation 56 counts a number $N_V$ of detected video end-of-process (vEOP) signals 22.

The audio signal monitoring operation 62 in a detect audio end-of-frame operation 64 determines when an audio frame is displayed by detecting an audio end-of-process (aEOP) signal 24. The aEOP signal 24 is generated by the DMA controller 224 in response to signals generated by an audio interface 908 device, such as Serial-Port 16-bit Sound-Comm Codec AD1843 (see FIGS. 6 and 12), when an audio signal frame is output thereby feeding back information relating to the amount of data transmitted. An accumulate audio frame count operation 66 counts a number $N_A$ of detected audio end-of-process (aEOP) signals 24.

Synchronization between the video presentation 2 and the audio presentation 12 is difficult since the interfaces controlling the timing, specifically the KS0119 Video Encoder and the Serial-Port 16-bit SoundComm Codec AD1843, respectively, are driven by different oscillators operating at different frequencies. In the personal computer environment, time reference signals are typically available to allow synchronization between audio and video presentations. In the illustrative system, the DMA controller 224, the KS0119 Video Encoder, and the Serial-Port 16-bit SoundComm Codec AD1843 operate in a master mode, in which internal clocks drive the respective circuits so that PC-type time reference signals are not available.

A compare audio/video frame count operation 70 compares the number $N_A$ of detected audio end-of-process (aEOP) signals 24 to the number $N_V$ of detected video end-of-process (vEOP) signals 22. The compare audio/video frame count operation 70 is performed at the occurrence of a selected event which may be a programmed event, such as at a selected count $N_V$ of detected video end-of-process (vEOP) signals 22 or a selected count $N_A$ of detected audio end-of-process (aEOP) signals 24.

In an illustrative embodiment, the aEOP signals 24 are generated every $1024/f_S$ second. The number 1024 is selected on the basis of the buffer size of a DMA port of DMA controller 224 (see FIG. 5), for transferring the audio data and $f_S$ designates the sampling frequency of the audio data. If a first aEOP signal 24 and a first vEOP signal 22 are presented simultaneously, then after the number $N_A$ of detected audio end-of-process (aEOP) signals 24 and the number $N_V$ of detected video end-of-process (vEOP) signals 22, the aEOP signals 24 overlap the vEOP signals 22 if, as follows:

$$N_V/f_V = N_A * 1024/f_S$$

where $f_V$ is the vEOP signal 22 frequency.

In one example, the compare audio/video frame count operation 70 is activated by a programmed count $N_V$ of detected video end-of-process (vEOP) signals 22 equal to $f_V$, the vEOP signal 22 frequency, so that synchronization is checked every second. After one second, a $(N_A+1)$th aEOP signal 24 is expected and a $(N_V+1)$th vEOP signal 22 is expected. Thus, $N_A+1$ aEOP signals 24 and $N_V+1$ vEOP signals 22 are expected to occur in a one-second period, although errors such as rounding errors in the $N_A$ count and asynchrony in the starting, times of the audio and video presentations are to be tolerated.

The compare audio/video frame count operation 70 compares the actual and expected counts $N_A$ of aEOP signals 24 and the actual and expected counts $N_V$ of vEOP signals 22. If the actual number of aEOP signals 24 is smaller than the expected count $N_A$ at the time a count of $N_V$ vEOP signals 22 are received, then the audio presentation 12 is lagging behind the video presentation 2. If the actual number of vEOP signals 22 is smaller than the expected count $N_V$ at the time a count of $N_A$ aEOP signals 24 are received, then the video presentation is more delayed than expected.

In practice, simultaneous activation of the audio presentation 12 and the video presentation 2 is difficult. Therefore, in one embodiment the video presentation 2 is activated prior to the activation of the audio presentation 12. The detect asynchrony subprocedure 60 monitors the $N_A$ and the $N_V$ counts to determine whether the $(N_A)$th aEOP signal 24 occurs between the $(N_V)$th and the $(N_V+1)$th vEOP signal 22, which occurs when the audio presentation 12 and the video presentation 2 are in synchrony. A program code that performs this operation is illustrated as follows:

```
int Nv=fv;
int Na=fs/1024;
void CalledAfterEachEOPv( ){
  . . .
  EOPvCount++;
  if(EOPvCount>=Nv+Offset)
    EOPvCount-=Nv;
  . . .
}
void CalledAfterEach EOPa( ){
  . . .
  EOPaCount++;
```

```
if((EOPaCount==Na) && (EOPvCount>Nv))
    DiscardAudioData( );
else if ((EOPaCount==Na) && (EOPvCount<Nv))
    InsertAudioData( );
if (EOPaCount>=Na+Offset)
    EOPaCount-=Na;
...
}
```

In an embodiment which is illustrated in timing diagrams shown in FIGS. 2A and 2B, the restore synchrony subprocedure 80 modifies the audio data stream to enforce audio/video synchronization, causing a small reduction in audio quality. In the case that the audio presentation 12 is lagging behind the video presentation 2, a condition illustrated in FIG. 2A, data are discarded from the audio stream so that the audio presentation 12 gains synchrony with the video presentation 2. For example, upon detection of loss of synchrony, the restore synchrony subprocedure 80 removes a designated percentage, such as two percent, of the next 1K of audio data. In one embodiment, the audio data is removed evenly from the 1K of audio data stream. One example of even removal of data is the discarding of a single sample of each 100 samples. In other embodiments, audio data is removed randomly from the audio stream. In still other embodiments, lowest amplitude audio data may be discarded so that the occurrence of silent periods is exploited.

In the case that the audio presentation 12 is leading the video presentation 2, a condition illustrated in FIG. 2B, additional audio data are inserted into the audio data stream so that the audio presentation 12 falls into synchrony with the video presentation 2. For example, upon detection of loss of synchrony, the restore synchrony subprocedure 80 interpolates the next 1K of audio data by two percent to generate a 1.02K audio data. The percentage amount of audio data that is removed or added to the audio stream is determined by the difference between the vEOP signal frequency $f_V$ and the aEOP signal frequency $f_A$. In various embodiments, audio data are added using different techniques. For example, audio data may be added via linear interpolation or other types of interpolation. Individual samples of audio data may be replicated in other embodiments.

An advantage of the restore synchrony subprocedure 80 utilizing manipulation of audio data is that such manipulation is easily accomplished by simple removal or addition of data. In contrast, video data depends more on ordering than audio data. This ordering is taken into consideration during performance of the video data so that video data manipulation involves a more complex manipulation procedure.

Figure 4A:
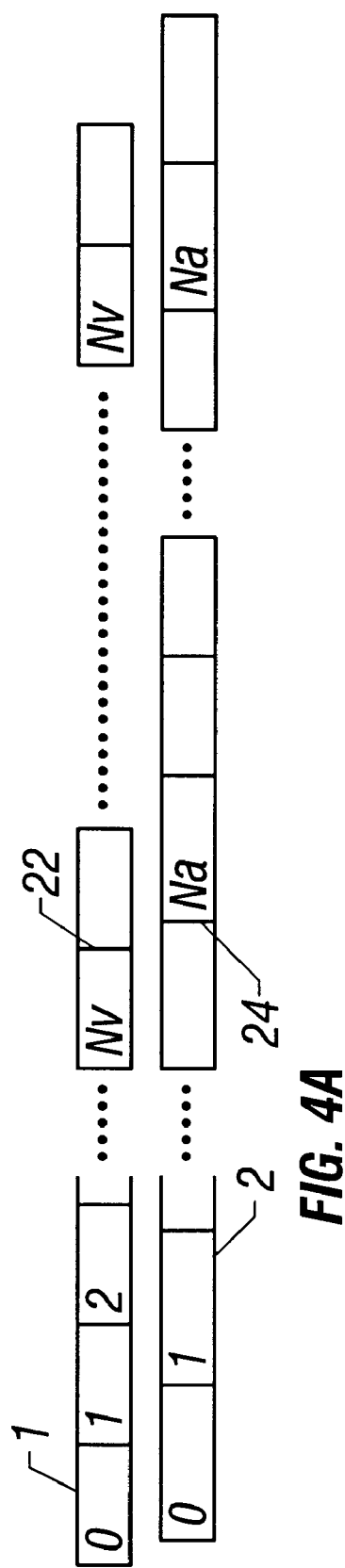
FIGS. 4A and 4B are timing diagrams illustrating a second embodiment of a technique for detecting and enforcing synchrony for an audio signal which lags a video signal and an audio signal which leads a video signal, respectively.
Figure 4B:
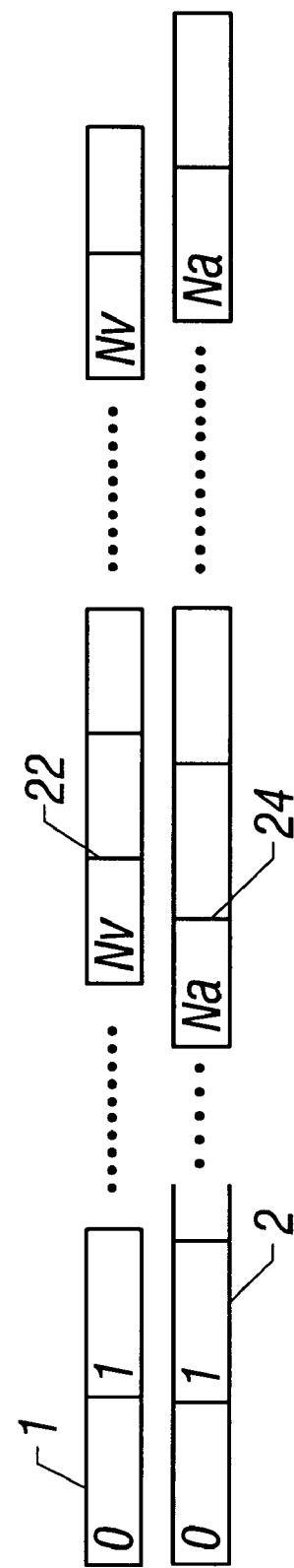

In another embodiment, the presentation of some video frames are skipped or repeated to achieve audio/video synchronization of MPEG audio and video presentations. Referring to FIGS. 4A and 4B, schematic timing diagrams illustrate an embodiment of an audio/video synchronization method including a restore synchrony subprocedure 80 that modifies the video data stream to enforce audio/video synchronization, causing a small reduction in video quality. In MPEG audio and video presentations, the presentation of audio frames and the presentation of video frames are coordinated using system timing signals. The system timing signals assure that the audio frames are played in synchrony with corresponding video frames if the audio and video presentations are controlled by the same timer. However, in practice, the audio presentation 410 and the video presentation 400 are typically controlled by different timers including an audio timing source and a video timing source. In the illustrative embodiment, the audio presentation 410 is timed using a Codec circuit, specifically a Serial-Port 16-bit SoundComm Codec AD1843 which is discussed in detail hereinafter with respect to the discussion of FIG. 12. Also in the illustrative embodiment, the video presentation is timed using an oscillator (not shown) in a graphics controller. One suitable graphics controller circuit is a KS0119 Video Encoder which is also discussed in detail hereinafter with respect to the discussion of FIG. 12.

Several factors create difficulties in achieving synchrony between the audio and video presentations. For example, a mismatch typically exists between the timing of the audio timing source and the video timing source so that, after some time interval, the audio presentation 410 is out of synchrony with the video presentation 400.

Furthermore, video decoding is sometimes delayed so that a video frame which is scheduled for presentation at a particular time may not be available on time.

The audio/video synchronization method described with reference to FIGS. 4A and 4B manipulates the video presentation 400 to match the audio presentation 410. A video frame 402 is generally presented a plurality of times on a video monitor because the video monitor output device is clocked at a higher frequency than the video frame rate. For example, a typical vertical frequency of VGA graphics controllers is 70 Hz while a common video frame rate is 25 Hz or 30 Hz. When the video presentation 400 lags the audio presentation 410, selected video frame presentations are skipped or discarded to allow the video presentation 400 to catch with the audio presentation 410. Alternatively, when the video presentation 400 is leading the audio presentation 410, selected video frame presentations are displayed a larger number of times to achieve synchronization.

The condition of audio/video synchrony is monitored using End-Of-Process (EOP) timing signals generated by hardware including, in the illustrative embodiment, an audio End-Of-Process (aEOP) signal 414 generated by the Serial-Port 16-bit SoundComm Codec AD1843 and a video End-Of-Process (vEOP) signal 404 generated by the KS0119 Video Encoder. The aEOP signal 414 is generated when an audio frame 412 is output or presented. The vEOP signal 404 is generated when a video frame 402 is output or presented. The number of aEOP signals and the number of vEOP signals are counted to detect an out-of-synchrony condition.

In the illustrative embodiment, the aEOP signals 414 are generated once each $1024/f_S$ seconds. The number 1024 is a function of DMA buffer size and the frequency $f_S$ is the sampling frequency of the audio data. If the first aEOP signal 414 and the first vEOP signal 404 are presented simultaneously, as shown in FIG. 4A, then after $N_A$ aEOP signals 414 and $N_V$ vEOP signals 404, an aEOP signal 414 and a vEOP signal 404 overlap if $N_V/f_V = N_A * 1024/f_S$, where $f_V$ is the frequency of the vEOP signals 404.

In one example, the number of vEOP signals 404 and the vEOP signal 404 frequency $f_V$ are chosen so that the synchronization status is checked every second. After one second, the $(N_V+1)$th vEOP signal 404 and the $(N_A+1)$th aEOP signal 414 are expected to be received simultaneously after one second. In actual operation, errors such as rounding errors in $N_A$ and asynchrony in starting the audio and video presentations are tolerated. However, the total number of aEOP signals 414 and vEOP signals 404 are expected to be predictable during the one second period. If the number of aEOP signals 414 is smaller than $N_A$ when $N_V$ vEOP signals 404 have been received, then the audio presentation 410 is lagging the video presentation 400 as shown in FIG. 4A. If the number of vEOP signals 404 is smaller than $N_V$ when $N_A$ aEOP signals 414 are received, then the video presentation 400 is slower than expected, as is shown in FIG. 4B. When the video presentation 400 is lagging, the number of repetitions of video frame presentations in a video frame is reduced. When the video presentation 400 is leading the audio presentation 410, then the number of repetitions of video frame presentations in a video frame is increased. The actual number of frame repetitions, in the cases of both a leading video presentation 400 and a lagging video presentation 400, are determined according to the discrepancy between the timing signals of the audio timing source and the video timing source.

In practice, simultaneous activation of the audio presentation 410 and the video presentation 400 is difficult. Therefore, in one embodiment the video presentation 400 is activated prior to the activation of the audio presentation 410. The $N_A$ and the $N_V$ counts are monitored to determine whether the $(N_A)$th aEOP signal 414 occurs between the $(N_V)$th and the $(N_V+1)$th vEOP signal 404, an event confirming that the audio presentation 410 and the video presentation 400 are in synchrony. A program code that performs this operation is illustrated as follows:

```
int Nv=fv;
int Na=fs/1024;
void CalledAfterEachEOPv( ){
  . . .
  EOPvCount++;
  if((EOPvCount<=Nv)&&(EOPaCount>=Na))
    SkipCount++;
  elseif((EOPvCount>Nv)&&(EOPaCount<Na))
    SkipCount--;
  if((SkipCount>0)&&((PresentationCounter+
    2*FrameRate)>=fv)&&
      NextFrameIsDecoded( ){
    /* skip one presentation to cut short video presentation */
    DisplayNextFrame( );
    PresentationCounter+=2*FrameRate-fv;
    SkipCount--;
    EOPvCount++;
  }
  elseif((PresentationCounter+FrameRate)>=fv){
    if(NextFrameIsDecoded( )){
      /* first presentation of the next frame */
      DisplayNextFrame( );
      if(SkipCount<0){
        /* add one presentation to the displayed frame */
        PresentationC ounter-=fv;
        SkipCount++;
        EOPvCount--;
      }
      else
        PresentationCounter+=FrameRate-fv;
    }
    } else {
      /*The video decoder is delayed, next frame not ready */
      DisplayLastFrame( );
      SkipCount++;
      EOPvCount--;
    }
  } else {
    /*Another presentation of the same frame */
    DisplayLastFrame( );
    PresentationCounter+=FrameRate;
  }
  . . .
}
```

An advantage of the restore synchrony subprocedure 80 utilizing manipulation of video data is that human perception of video imperfections is not as acute as the perception of audio artifacts so that the manipulation of video data is not as perceptible.

Synchronization between the audio and video data streams is facilitated by a technique for efficiently handling the video frame buffers, which is discussed in more detail in U.S. patent application Ser. No. 08/733,436 entitled "APPARATUS AND METHOD FOR MANAGING A FRAME BUFFER FOR MPEG VIDEO DECODING IN A PC ENVIRONMENT", Fung, H. T., filed on the same day as the present application, which is incorporated by reference herein in its entirety.

Figure 5:
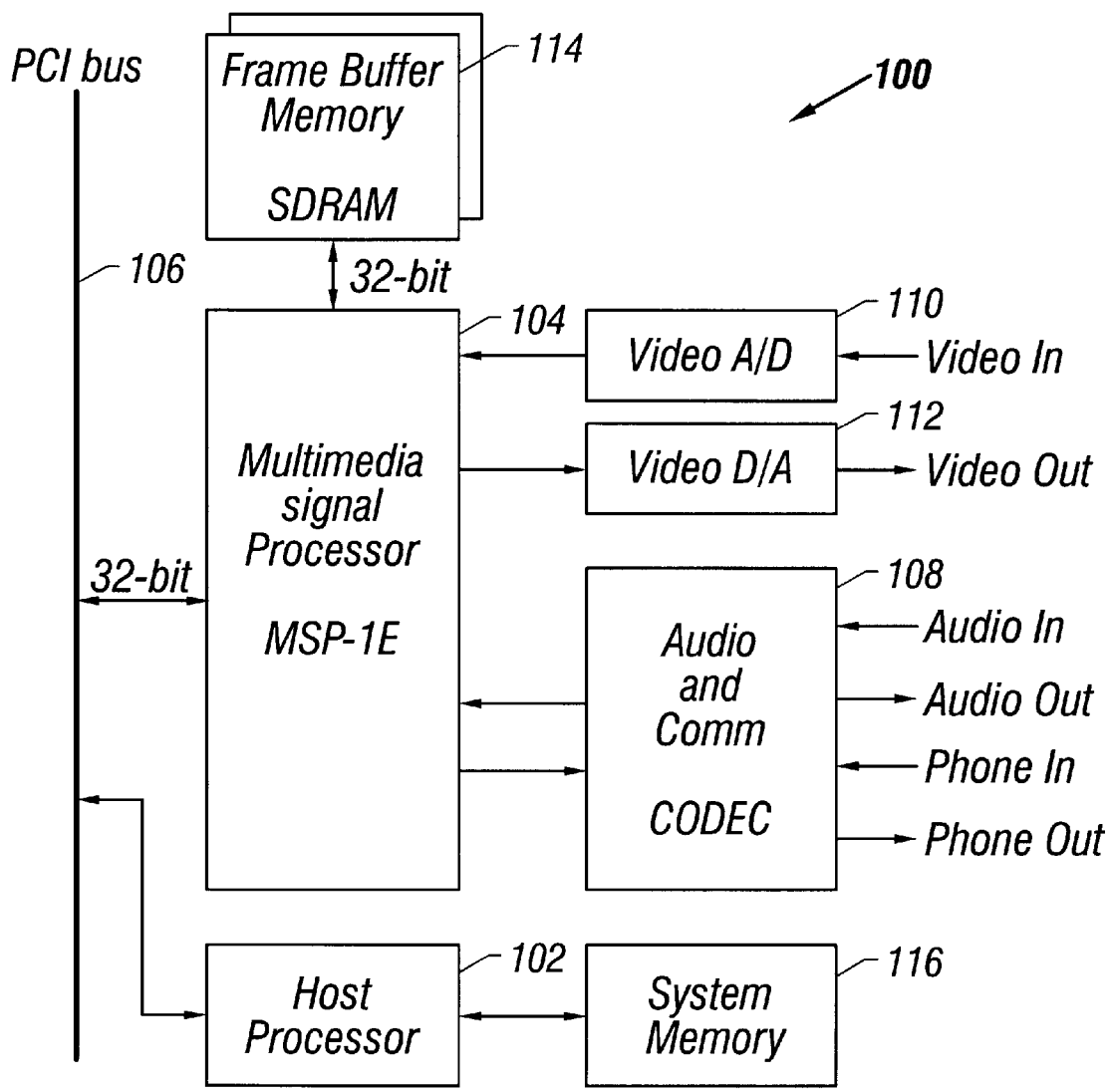
FIG. 5 is a high-level schematic block diagram illustrating a multimedia multiprocessor system in accordance with an embodiment of the present invention.

Referring to FIG. 5 a high-level schematic block diagram illustrates a multimedia multiprocessor system 100 which implements an illustrative technique for synchronizing audio and video frames in an MPEG presentation system. The multimedia multiprocessor system 100 includes a host processor 102 and a multimedia signal processor 104. A typical host processor 102 is an x86 processor such as a Pentium or Pentium Pro processor. The host processor 102 executes programs based on instructions and data held in a system memory 116. The host processor 102 communicates with the multimedia signal processor 104 via a system bus 106 such as a PCI bus. The multimedia signal processor 104 interfaces to various functional blocks such as an audio and communication CODEC 108, a video A/D converter 110, a video D/A converter 112, and a frame buffer SDRAM memory 114.

Figure 6:
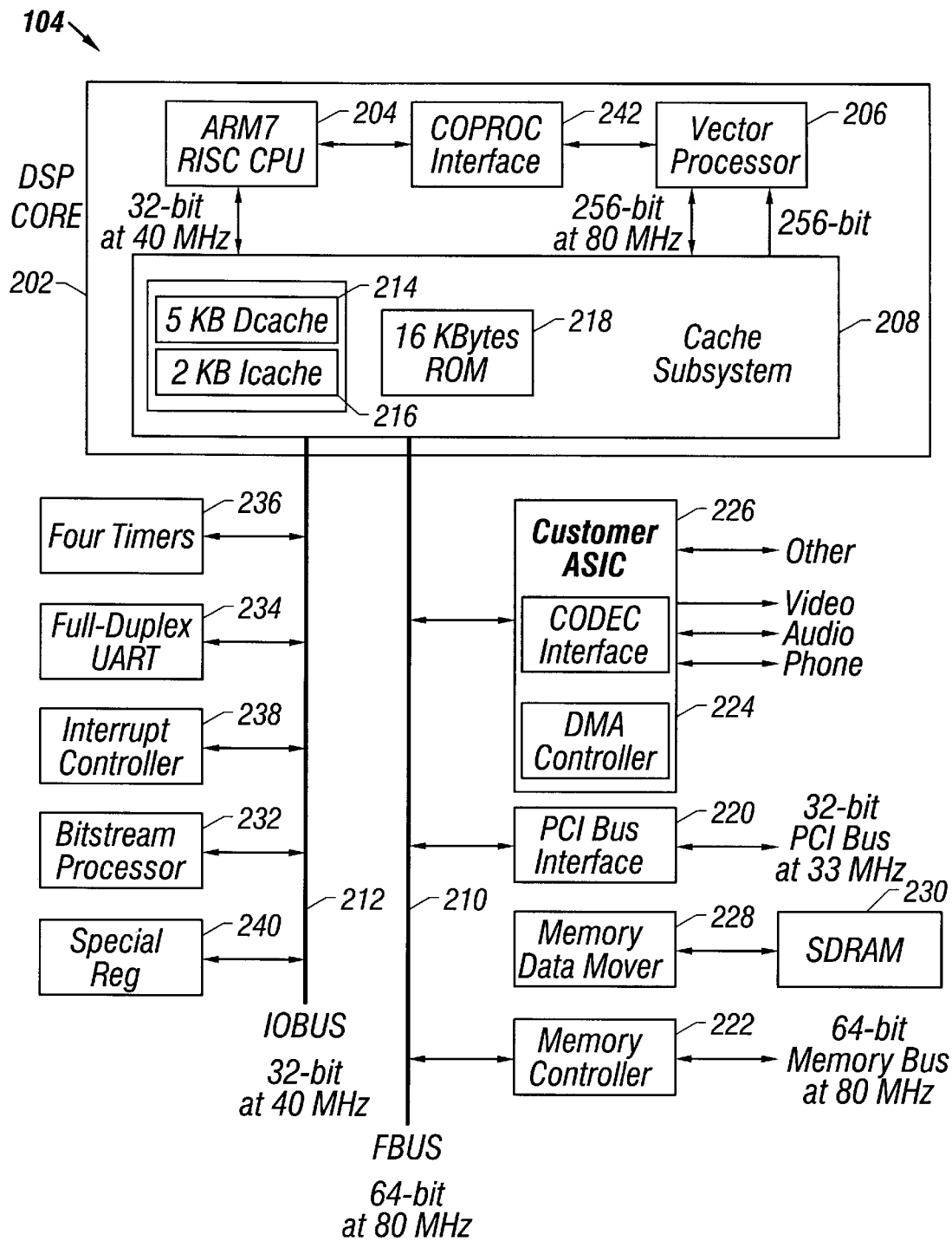
FIG. 6 is a schematic block diagram showing a multimedia signal processor included in the multimedia multiprocessor system illustrated in FIG. 5.

Referring to FIG. 6, a schematic block diagram shows the multimedia signal processor 104 within the multimedia multiprocessor system 100. The multimedia signal processor 104 includes a digital signal processor (DSP) core 202 which is connected to a plurality of multimedia interfaces.

The DSP core 202 is the computation engine of the multimedia signal processor 104 and includes a scalar processor 204, a vector processor 206, a cache subsystem 208, a fast bus (FBUS) 210, and an I/O bus 212. The scalar processor 204 is a scalar processor based on a 32-bit ARM7 control processor which is designed and manufactured by ARM Limited, Great Britain, and performs general processing functions such as real-time operating system operations, interrupt and exception handling, input/output device management, communication with the host processor 102 and the like. In one embodiment, the scalar processor 204 operates at 40 MHz. The scalar processor 204 interfaces to the vector processor 206 through a coprocessor interface 242.

The multimedia signal processor 104 performs multiple various multimedia operations. One multimedia operation is audio decoding so that the scalar processor 204 and the vector processor 206, in combination with program codes which operate on the processors, form an audio processor 205.

Figure 7:
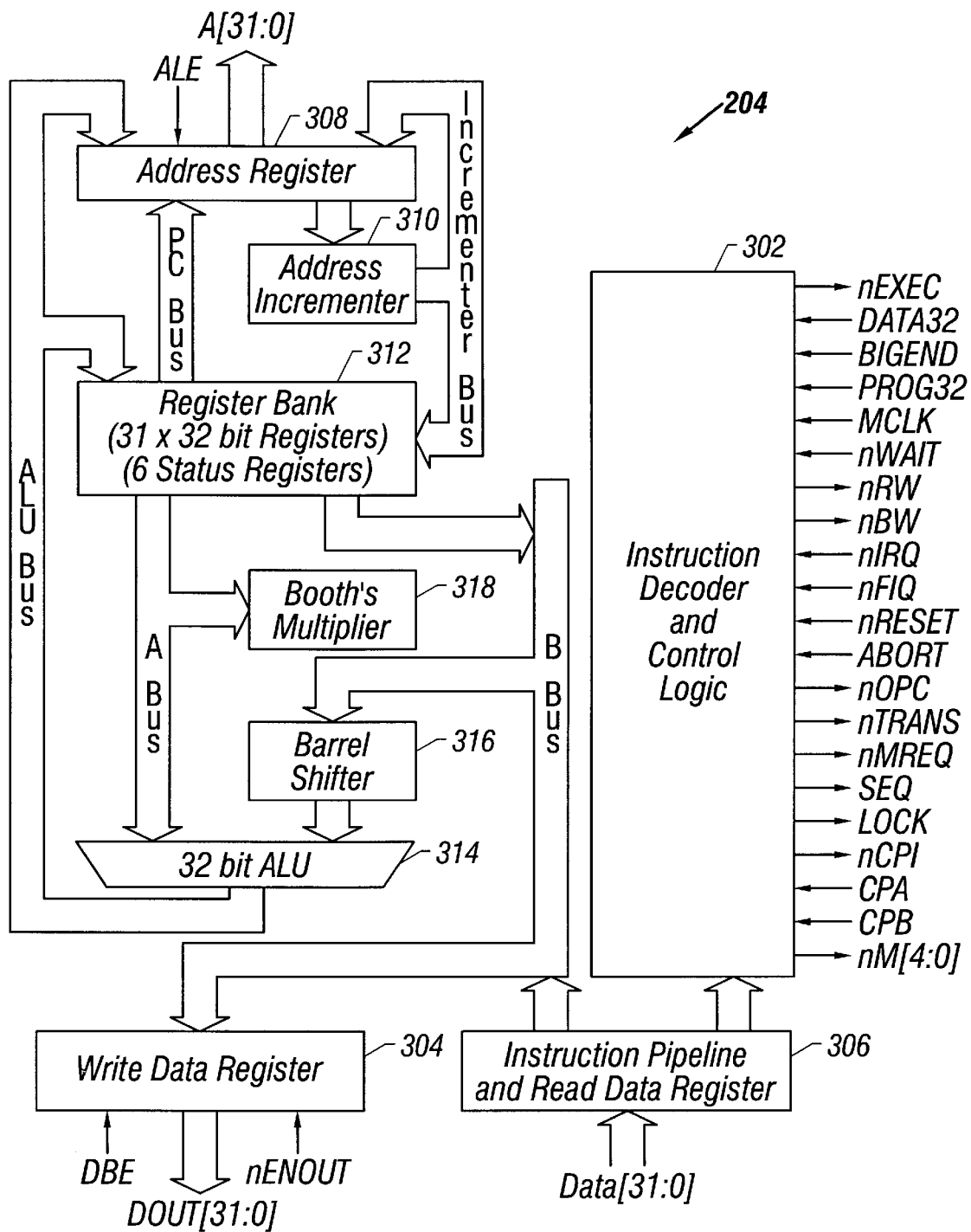
FIG. 7 is a schematic block diagram which illustrates a control processor in the multimedia multiprocessor system.

Referring to FIG. 7, a schematic block diagram illustrates the ARM7 scalar processor 204 which is controlled by an instruction decoder and control logic 302. The scalar processor 204 communicates with the cache subsystem 208 via a write data register 304 and an instruction pipeline and read data register 306. The scalar processor 204 includes an address register 308 and an address incrementer 310 for addressing data in a 31×32-bit register bank 312. The scalar processor 204 includes arithmetic logic such as a 32-bit ALU 314, a barrel shifter 316 and a Booth's multiplier 318. The coprocessor interface 242 is coupled directly to the instruction decoder and control logic 302 via nOPC, nCPI, CPA and CPB signal lines that communicate operation codes and instruction arguments between the scalar processor 204 and the vector processor 206 through the coprocessor interface 242.

Figure 8:
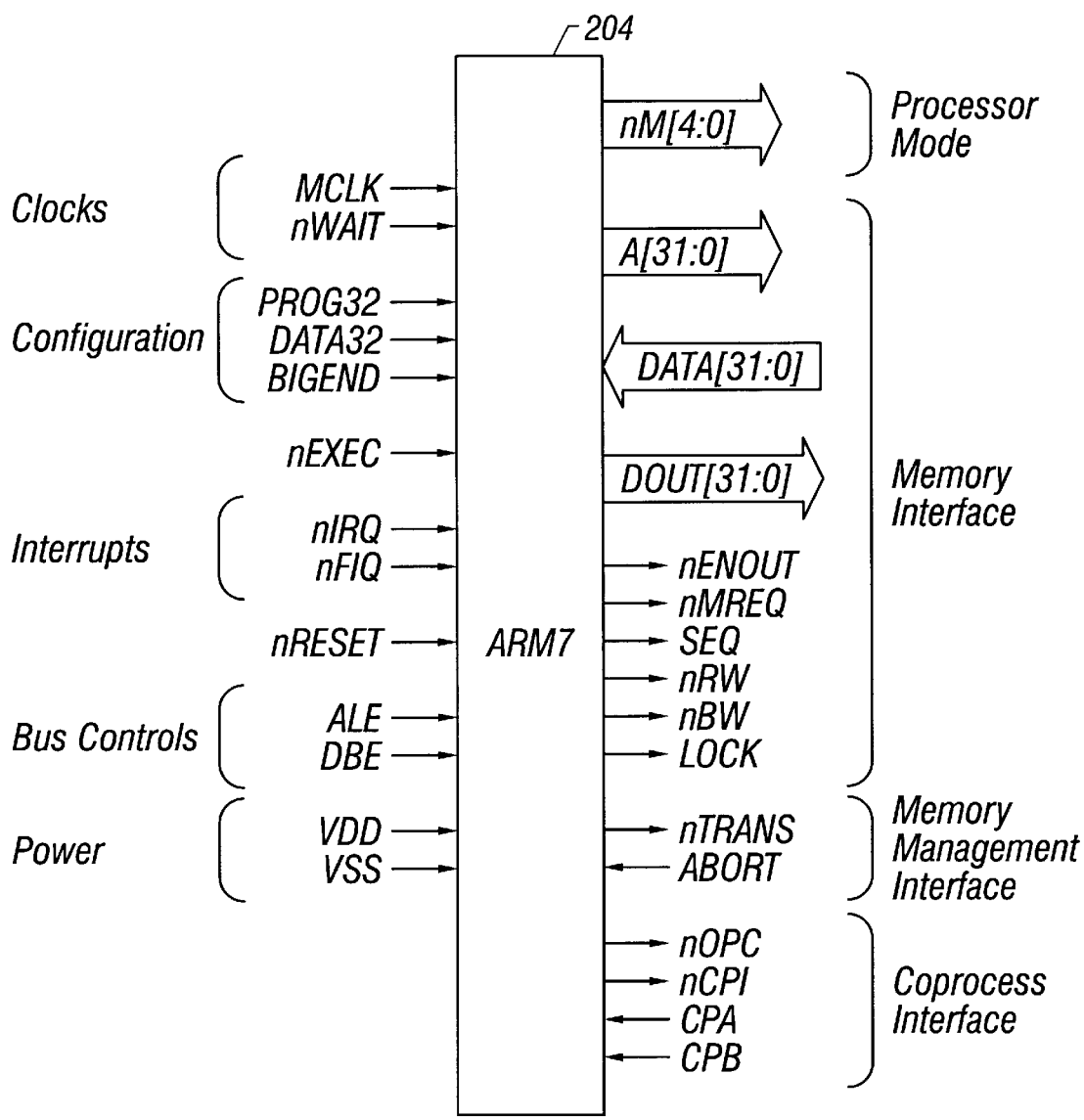
FIG. 8 is a functional diagram of the control processor.

FIG. 8 illustrates a functional diagram of the scalar processor 204. The scalar processor 204 executes scalar operations including indexing and conditional operations. The scalar processor 204 initiates operations of the vector processor 206. Specifically, the scalar processor 204 controls interactions with the vector processor 206 through extensions to the scalar processor 204 instruction set. The instruction set extensions include coprocessor data operations such as a STARTVP and a INTVP instruction, coprocessor data transfers, and coprocessor register transfers, such as a TEST-SET instruction and MFVP, MTVP, MFER and MTER instructions for reading and writing registers of the vector processor 206.

Referring again to FIG. 6, the vector processor 206 is the digital signal processing engine of the multimedia signal processor 104. The vector processor 206 has a Single-Instruction Multiple-Data architecture and includes a pipelined RISC engine that operates on multiple data elements in parallel to perform signal processing functions such as Discrete Cosine Transforms (DCT), FIR filtering, convolution, video motion estimation and other processing operations. The vector processor 206 supports vector arithmetic in which multiple data elements are operated upon in parallel, in the manner of a vector process, by a plurality of vector execution units. The vector processor 206 executes both scalar operations and combined vector-scalar operations. The multiple data elements of the vector processor 206 are packed in a 288-bit vector which is computed at a rate of thirty-two 8/9-bit fixed-point arithmetic operations, sixteen 16-bit fixed-point arithmetic operations, or eight 32-bit fixed-point or floating point arithmetic operations per cycle (for example, 12.5 ns). Most 32-bit scalar operations are pipelined at a rate of one instruction per cycle while most 288-bit vector operations are pipelined at a rate of one instruction in two cycles. Load and store operations are overlapped with arithmetic operations and are executed independently by separate load and store circuits.

Figure 9:
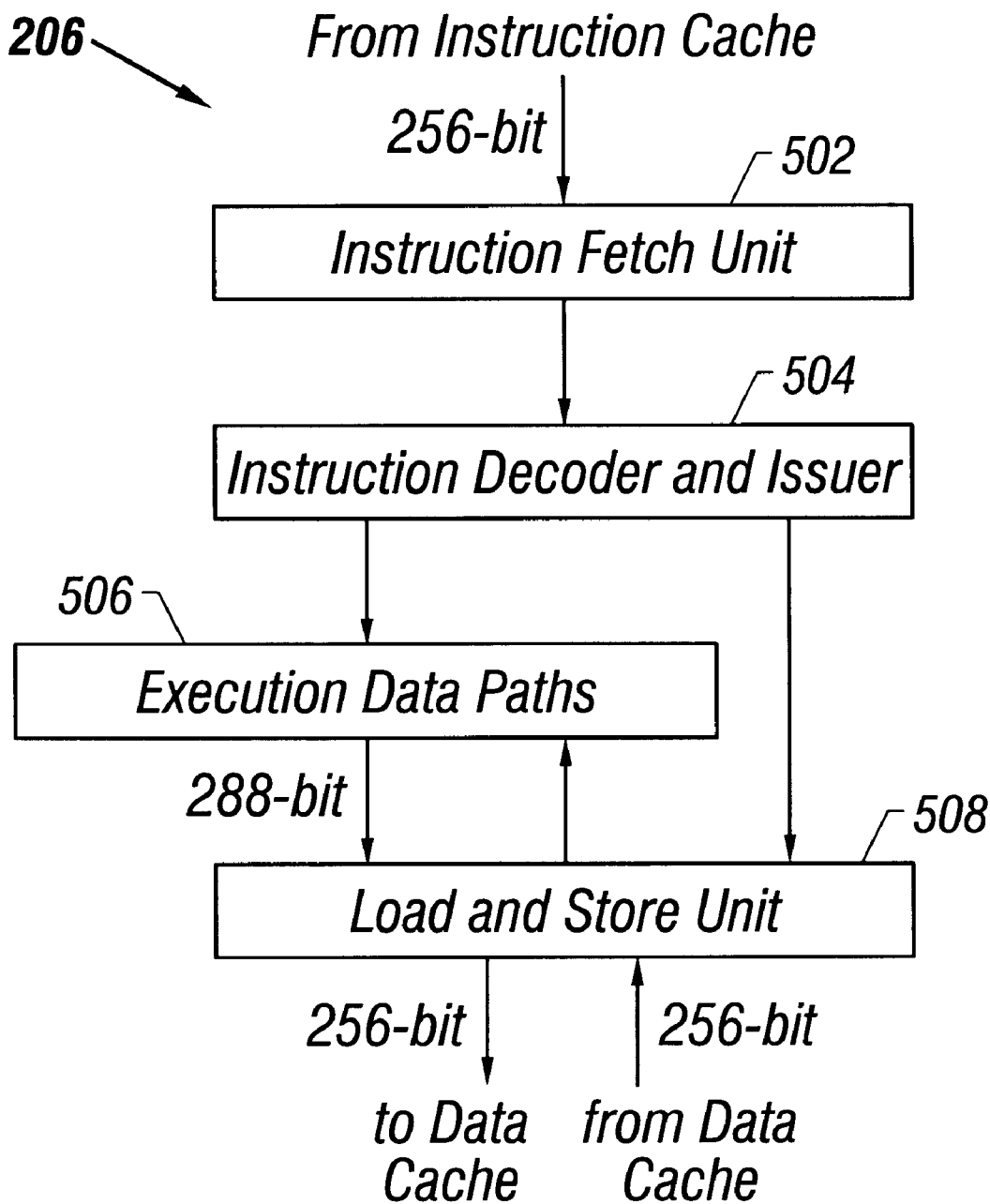
FIG. 9 is a schematic block diagram showing a vector processor in the multimedia signal processor illustrated in FIG. 6.

Referring to FIG. 9, the vector processor 206 has four functional blocks including an instruction fetch unit 502, an instruction decoder and issuer 504, an instruction execution data path 506, and a load and store unit 508. The instruction fetch unit 502 and the instruction decoder and issuer 504 are included in the vector processor 206 to allow the vector processor 206 to operate independently of the scalar processor 204.

The instruction fetch unit 502 prefetches instructions and processes control flow instructions such as Branch and Jump to Subroutine instructions. The instruction fetch unit 502 contains a 16-entry queue of prefetched instructions for the current execution stream and an eight-entry queue of prefetched instructions for the Branch target stream. The instruction fetch unit 502 receives up to eight instructions from the instruction cache in a cycle. The instruction decoder and issuer 504 decodes and schedules all instructions executed by the vector processor 206. The decoder processes one instruction in a cycle in the order of receipt from the instruction fetch unit 502, while the issuer schedules most instructions out-of-order depending on both the execution resource and operand data availability.

Figure 10:
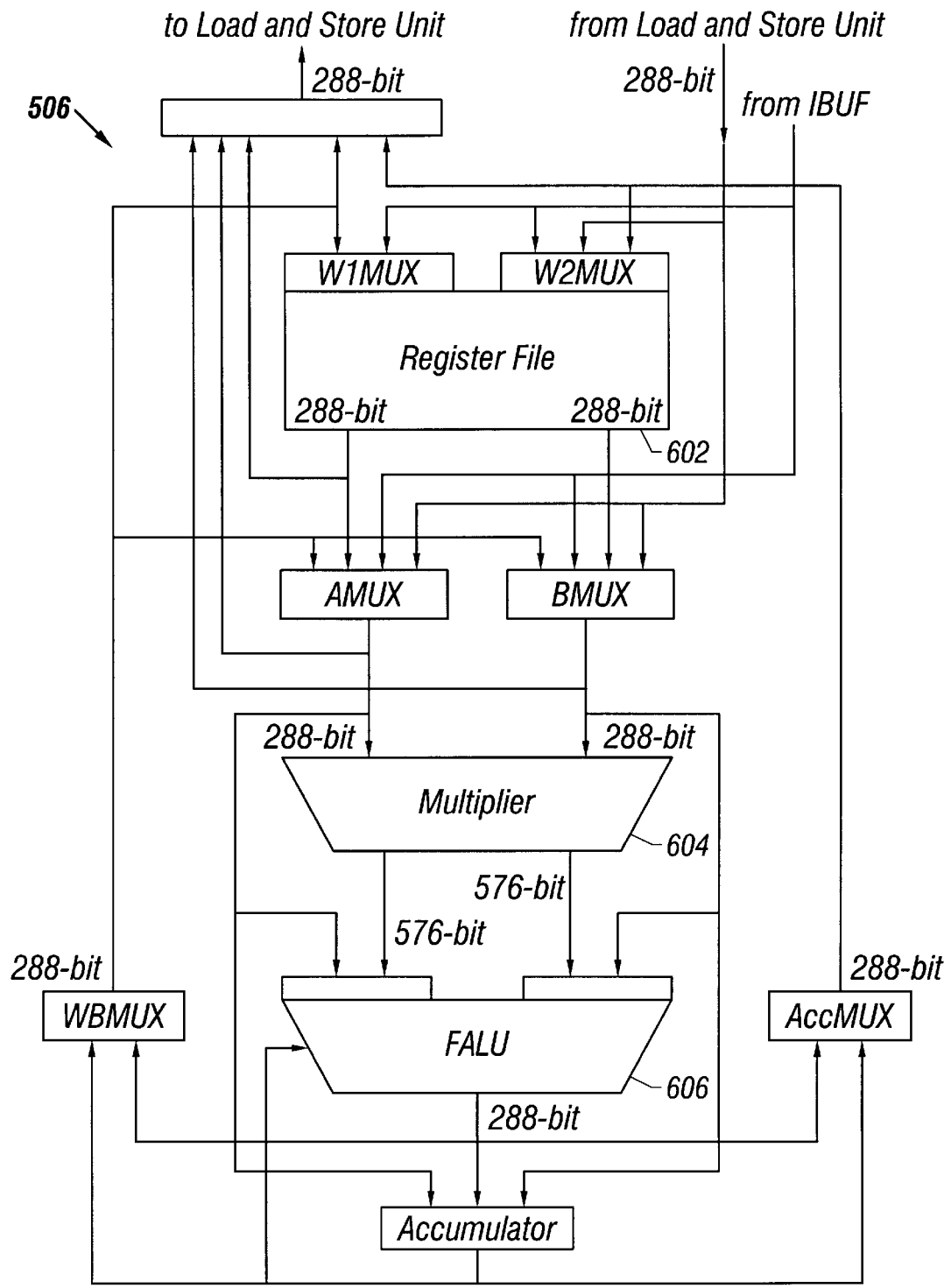
FIG. 10 is a schematic block diagram showing vector processor execution data paths of the vector processor illustrated in FIG. 9.

Referring to FIG. 10, the instruction execution data path 506 includes a four-port register file 602, eight 32×32 parallel multipliers 604, and eight 36-bit ALUs 606. The register file 602 supports two read operations and two write operations per cycle. The parallel multipliers 604 produce up to eight 32-bit multiplications in integer or floating point format, or sixteen 16-bit multiplications or thirty-two 8-bit multiplications per cycle. The ALUs 606 execute either eight 36-bit ALU operations in integer or floating point format, sixteen 16-bit ALU operations, or thirty-two 8-bit operations per cycle (for example, 12.5 ns).

The register file 602 includes a plurality of special-purpose registers and a plurality of return address registers. The special-purpose registers include a vector control and status register (VCSR), a vector program counter (VPC), a vector exception program counter (VEPC), a vector interrupt source register (VISRC), a vector and scalar processor synchronization register (VASYNC) and other registers such as various count, mask, overflow and breakpoint registers. The vector program counter (VPC) is the address of the next instruction to be executed by the vector processor 206.

Figure 11:
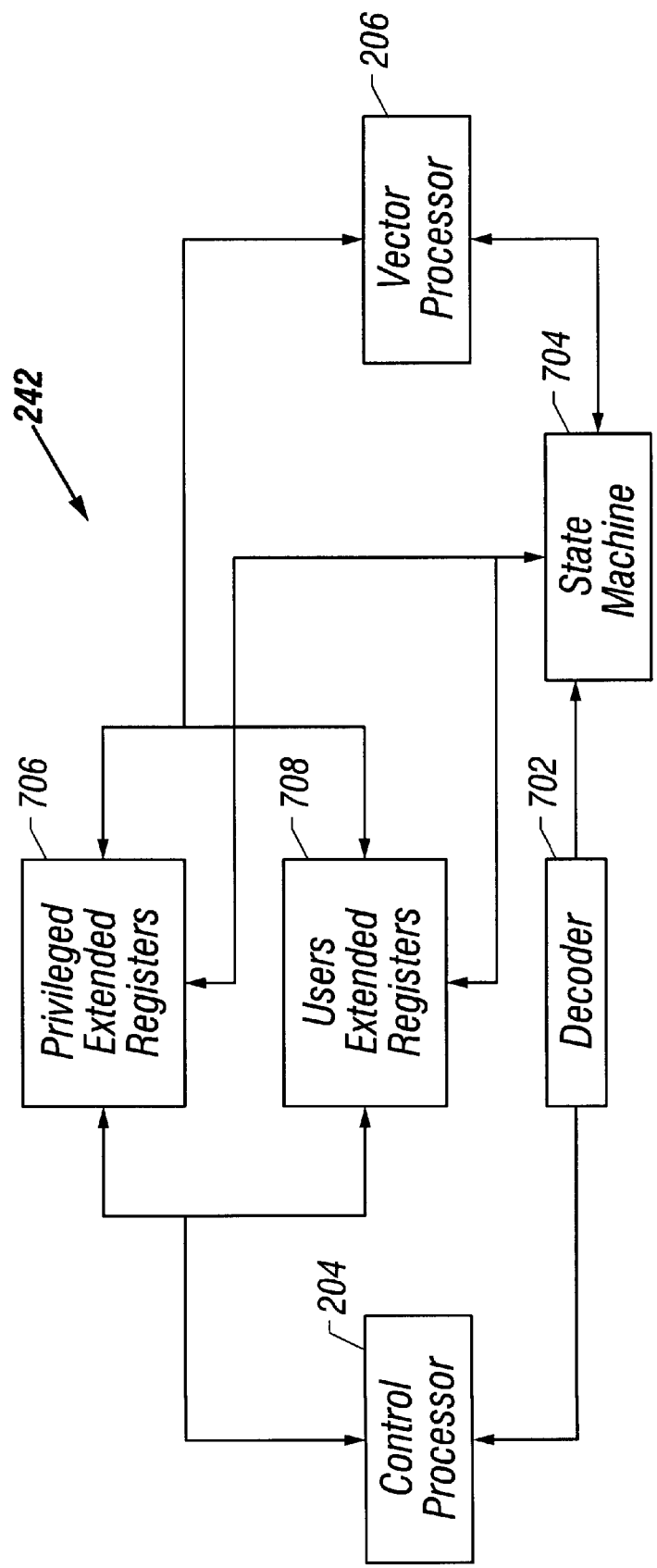
FIG. 11 is a schematic block diagram showing a coprocessor interface in the multimedia signal processor illustrated in FIG. 6.

A schematic block diagram of the coprocessor interface 242 is shown in FIG. 11. The coprocessor interface 242 supplements the functionality of the scalar processor 204, adding registers and logic functions for implementing instructions that extend the instruction set of the scalar processor 204. The coprocessor interface 242 includes registers for communicating between the scalar processor 204 and the vector processor 206. The coprocessor interface 242 also serves as a buffer for communicating data and signals between structures that operate at different clock rates. In one embodiment, the scalar processor 204 operates at a 40 MHz rate and the video presentation 2 executes at 80 MHz.

The coprocessor interface 242 includes a decoder 702, a state machine 704, a privileged extended register block 706, and a users extended register block 708. The registers in the privileged extended register block 706 and the users extended register block 708 are readable and writeable by the scalar processor 204 and by the vector processor 206. The decoder 702 decodes instructions of the scalar processor instruction set. The scalar processor instruction set includes instructions that are executable on the scalar processor 204 and extended instructions that are not executed by the scalar processor 204 but are instead executed by the coprocessor interface 242 to implement special coprocessor functionality. The decoder 702 decodes scalar processor instructions, detects extended instructions and supplies detected extension instructions to the state machine 704 for execution. The state machine 704 includes logic for implementing the extension instructions. The privileged extended register block 706 are extended registers which are accessed during execution of special instructions by the scalar processor 204.

Referring again to FIG. 6, the cache subsystem 208 includes a data cache 214 (for example, 5KB), an instruction cache 216 (for example, 2KB), and a cache ROM 218 (for example, 16KB) and typically operates at the same speed as the vector processor 206 (80 MHz). In one embodiment, the cache subsystem 208 includes 1 Kbyte of instruction storage and 1 Kbyte of data storage for the scalar processor 204, 1 Kbyte of instruction storage and 4 Kbyte of data storage for the vector processor 206, and a shared 16 Kbyte of integrated instruction and data cache ROM for both the scalar processor 204 and the vector processor 206. The cache subsystem 208 interfaces to the scalar processor 204 through 32-bit data buses and interfaces to the vector processor 206 through 128-bit data buses. The cache ROM 218 includes uROM initialization software, self-test diagnostics software, various system management software, library routines and a cache for selected instructions and data constants. Specifically, the cache ROM 218 includes an instruction exception handler and input and output device interrupt handlers 0, 1, 2 and 3 for the scalar processor 204. The cache ROM 218 also includes a vector processor interrupt handler and a vector processor breakpoint exception handler which execute in the scalar processor 204.

The FBUS 210 interfaces to a plurality of FBUS peripherals including, for example, a 32-bit PCI bus interface 220, a 64-bit SDRAM memory controller 222, an 8-channel DMA controller 224, a customer ASIC logic block 226, and a memory data mover 228. The PCI bus interface 220 interfaces to the system bus 106 and operates, for example, at 33 MHz. The customer ASIC logic block 226 furnishes control logic for implementing custom functionality, as desired. The customer ASIC logic block 226, in one embodiment, supplies 10 Kgates including interfaces to various analog CODECs and customer-specific I/O devices. The memory data mover 228 transfers DMA data from the host processor 102 to SDRAM memory 230 which is local to the multimedia signal processor 104.

The I/O bus 212 interfaces to a plurality of I/O bus devices including, for example, a bit stream processor 232, a UART serial line 234, a timer circuit 236, an interrupt controller 238, and a special register 240. The bit stream processor 232 processes the video bit stream. The special register 240 is used for software-controlled initialization and interrupt handling.

Figure 12:
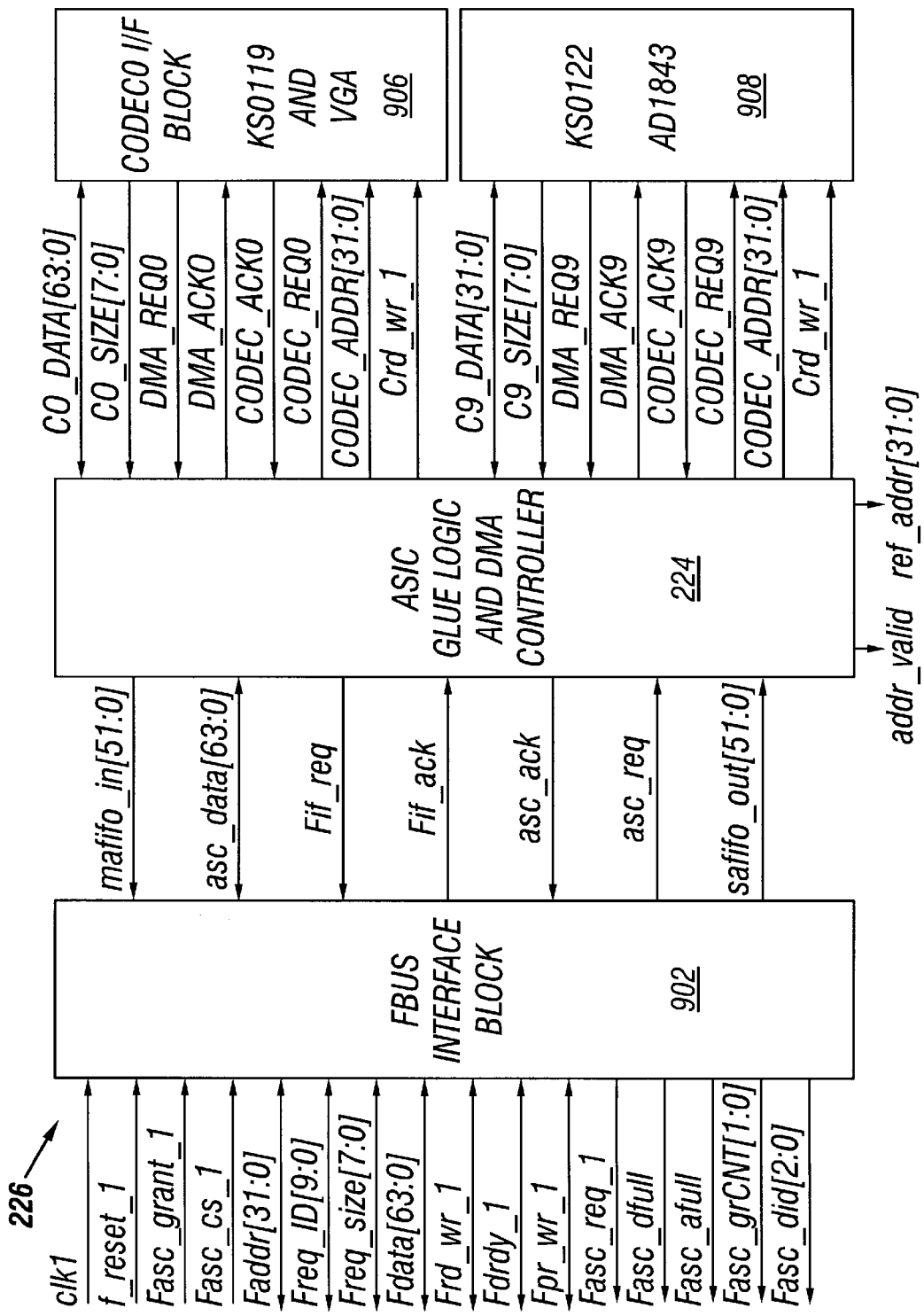
FIG. 12 is a schematic block diagram illustrating an ASIC logic block of the multimedia signal processor.

Referring to FIG. 12, a schematic block diagram illustrates a more detailed view of the customer ASIC logic block 226 including an FBUS interface block 902, the DMA controller 224, a CODEC interface control block 906, and an audio interface 908.

In the illustrative embodiment, the aEOP signal 24 is generated by the DMA controller 224. Audio data is transferred from the SDRAM memory 230 to the audio interface 908. The amount of data that is transferred is monitored by the audio interface 908. The amount of data that constitutes a frame of data is known and signaled to the DMA controller 224. The DMA controller 224 generates an interrupt signal corresponding to the aEOP signal 24 for each frame transferred. The interrupt signal is transferred to the scalar processor 204. One suitable audio interface 908 is a Serial-Port 16-bit SoundComm Codec AD1843 which is manufactured and sold by Analog Devices, Inc., Norwood, Mass. The AD1843 is a single-chip integrated speech, audio, fax and modem codec including highly configurable stereo sigma-delta analog-to-digital converters (ADCs) and quad sigma-delta digital-to-analog converters (DACs). The AD1843 supports thirteen analog input terminals and seven analog output terminals. The AD1843 includes on-chip signal filters including digital interpolation and digital decimation filters, and an analog output low-pass filter.

In the illustrative embodiment, the vEOP signal 22 is also generated by the DMA controller 224. Frame buffer data is transferred from the SDRAM memory 230 to the CODEC interface control block 906, the CODEC interface control block 906 generates a vertical sync signal at approximately 70 Hz that is passed to the DMA controller 224. The DMA controller 224 generates an interrupt signal corresponding to the vEOP signal 22 based on the timing of the vertical sync signal generated by the CODEC interface control block 906. The DMA controller 224 generates an interrupt signal corresponding to the vEOP signal 22 for each video frame transferred. Accordingly the DMA controller 224 relays a signal indicative of video frame data transfer from the CODEC interface control block 906 to the scalar processor 204. One suitable CODEC interface control block 906 circuit is a KS0119 Video Encoder(Samsung Semiconductor) which combines NTSC encoding with conventional RAMDAC functions so that digitized video or computer-generated graphics are displayed on either NTSC or Personal Computer (PC) monitors. The KS0119 Video Encoder includes two data input channels to allow signal mixing with signal mixing also supported at an output terminal. The KS0119 Video Encoder supports NTSC CVBS, S-VIDEO, or RGB display.

A video frame is transmitted to a VGA monitor or other display device (not shown) through the DMA controller 224. When an output request is made, the DMA controller 224 sends data to the display via an encoder (not shown). When the data transfer is complete, the DMA controller 224 generates a vEOP signal 22 designating the end of processing for the display request.

Figure 13:
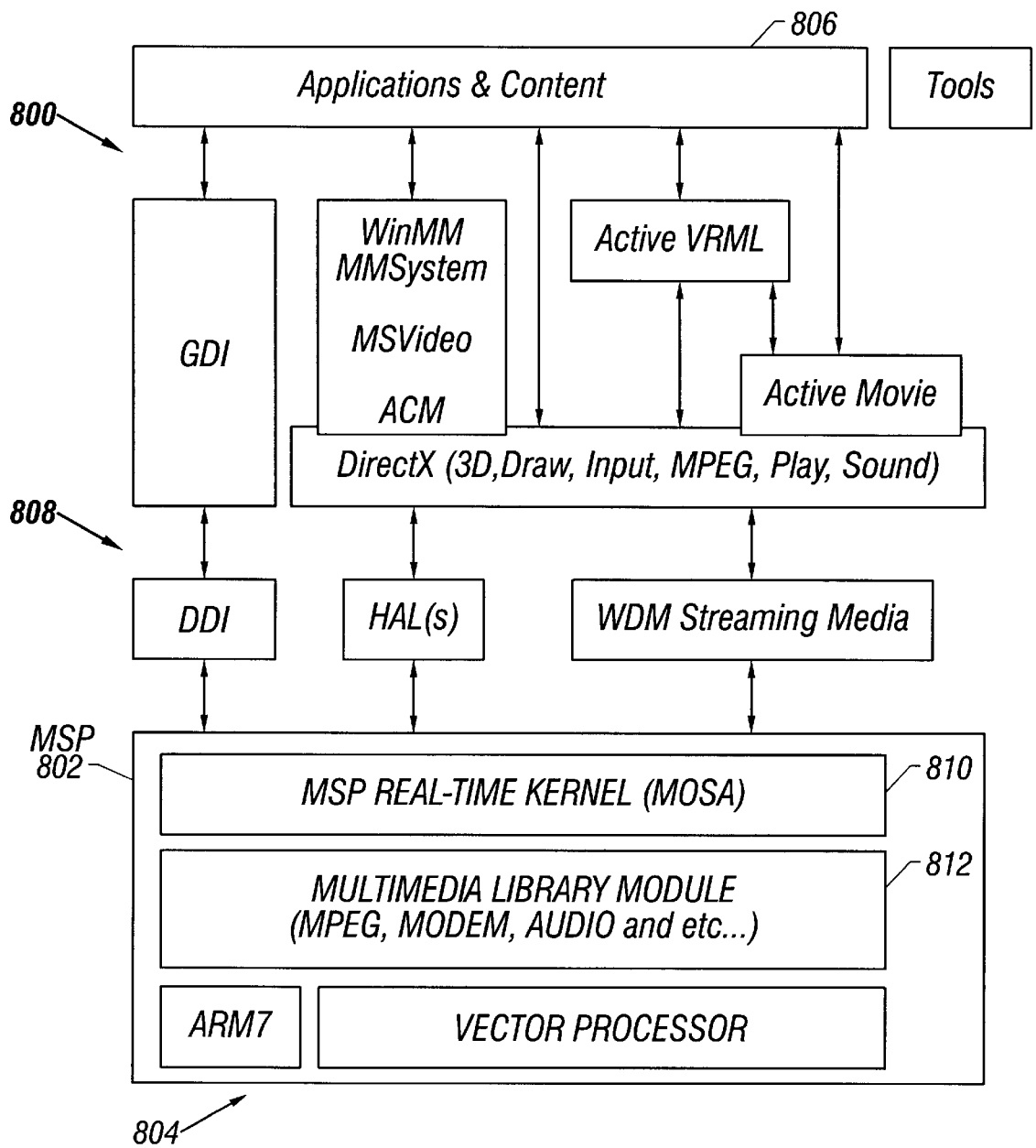
FIG. 13 is a schematic block diagram showing a software and firmware architecture of the multimedia signal processor including MSP system component software executing on the multimedia signal processor and PC applications and operating system software executing on a host processor.

Referring to FIG. 13, a schematic block diagram illustrates the software and firmware architecture 800 of the multimedia signal processor 104 including MSP system component software 802 executing on the multimedia signal processor 104 and PC applications and operating system software 808 executing on the host processor 102. The multimedia signal processor 104 is controlled by firmware including a vectorized-DSP firmware library 804 which executes on the vector processor 206 and a system management function block 806 which executes on the scalar processor 204. The a vectorized-DSP firmware library 804 and the system management function block 806 are included in MSP system component software 802. The architecture 800 advantageously separates signal processing functionality from host application control operations to simplify software development, improve software design management and reduce applications development and maintenance costs.

The MSP system component software 802 executes exclusively on the scalar processor 204 and includes an MSP real-time kernel 810, a multimedia library module 812, the system management function block 806 and the vectorized-DSP firmware library 804. The MSP real-time kernel 810 is typically responsible for interfacing to the host processor 102, resource management, I/O device handling and most interrupt and exception processing. The MSP real-time kernel 810 includes software for interfacing to Windows and Windows NT software executing in the host processor 102. The MSP real-time kernel 810 also includes software for selecting and downloading selected application firmware from the host processor 102, software for scheduling tasks for execution in the scalar processor 204 and the vector processor 206, and software for managing system resources of the multimedia signal processor 104 including memory and I/O devices. The MSP real-time kernel 810 includes software for synchronizing communication between tasks of the multimedia signal processor 104 and software for reporting MSP-related interrupt, exception and status conditions.

The a vectorized-DSP firmware library 804 performs substantially all digital signal processing functions. The a vectorized-DSP firmware library 804 also controls specific special interrupts such as a Coprocessor Interrupt which is issued by the scalar processor 204 to the vector processor 206, or a Hardware Stack Overflow Exception, which is generated within the vector processor 206.

The multimedia library module 812 performs communications-handling functions including data communication, MPEG video and audio, speech coding and synthesis, SoundBlaster-compatible audio and the like. The MSP real-time kernel 810 is a real-time, robust, multitasking, pre-emptive operating system including enhancements which facilitate multimedia applications executing on the multimedia signal processor 104.

The PC applications and operating system software 808 executing in the host processor 102 controls the multimedia signal processor 104 by reading and writing MSP control and status registers via the system bus 106, and writing to shared data structures that are resident to the system memory 116 and resident to the multimedia signal processor 104.

MSP program execution begins with the scalar processor 204 which executes a first execution stream. The scalar processor 204 may initiate a second independent execution stream in the vector processor 206. Operations of the scalar processor 204 and the vector processor 206 are synchronized through specific coprocessor instructions that operate in the scalar processor 204, including STARTVP, INTVP and TESTVP instructions, and special instructions executing in the vector processor 206, including VJOIN and VINT instructions. Data transfer between the scalar processor 204 and the vector processor 206 are performed using data movement instructions executed in the scalar processor 204.

While the invention has been described with reference to various embodiments, it will be understood that these embodiments are illustrative and that the scope of the invention is not limited to them. Many variations, modifications, additions and improvements of the embodiments described are possible. For example, the embodiments are described as systems which utilize a multiprocessor system including a Pentium host computer and a particular multimedia processor. Other processor configurations may be used in other embodiments.

What is claimed is:

1. An apparatus for synchronizing audio and video presentation signals in a multiprocessor multimedia system comprising:

a data source for supplying a video data bitstream and an audio data bitstream;

a video signal interface coupled to the data source for receiving the video data bitstream, converting the video data bitstream into video performance signals, and transmitting the video performance signals to a video display, the video signal interface having a first timing signal source;

an audio signal interface coupled to the data source for receiving the audio data bitstream, converting the audio data bitstream into audio performance signals, and transmitting the audio performance signals to an audio speaker, the audio signal interface having a second timing signal source having a timing independent from the first timing signal source;

a controller coupled to the video signal interface, the audio signal interface, and the data source, the controller having a program code including:

an audio/video synchrony monitoring routine for determining whether the audio performance signals are asynchronous to the video performance signals; and an audio/video synchrony restoring routine operative when the audio performance signals are asynchronous to the video performance signals.

2. An apparatus according to claim 1 wherein:

the audio signal interface generates an audio end of process (aEOP) signal upon transmitting the audio performance signals;

the video signal interface generates a video end of process (vEOP) signal upon transmitting the video performance signals;

the audio/video synchrony monitoring routine includes a routine for counting the relative number of aEOP and vEOP signals to detect when the audio performance signals are asynchronous to the video performance signals.

3. An apparatus according to claim 2 wherein:

the audio/video synchrony monitoring routine includes an asynchrony detection routine for comparing the count of aEOP signals received to an expected number of aEOP signals after receipt of a predefined number of vEOP signals are received.

4. An apparatus according to claim 2 wherein:

the audio/video synchrony monitoring routine includes a routine for determining whether the audio performance signal leads the video performance signal or the audio performance signal lags behind the video performance signal; and the audio/video synchrony restoring routine includes:

a routine for discarding samples from the audio performance signal when the audio performance signal lags behind the video performance signal; and a routine for adding samples to the audio performance signal when the audio performance signal leads the video performance signal.

5. An apparatus according to claim 4 wherein:

the routine for discarding samples from the audio performance signal when the audio performance signal lags behind the video performance signal implements a discarding technique selected from among the techniques of:

discarding samples evenly dispersed throughout the audio data bitstream;

discarding samples dispersed at random in the audio data bitstream; and discarding samples having an amplitude lower than a preselected threshold amplitude.

6. An apparatus according to claim 4 wherein:

the routine for adding samples to the audio performance signal when the audio performance signal leads the video performance signal implements an adding technique selected from among the techniques of: interpolating samples in the audio data bitstream; and duplicating samples in the audio data bitstream.

7. An apparatus according to claim 2 wherein:

the audio/video synchrony monitoring and restoring routines include a routine for receiving the video data bitstream at a vertical sync rate and converting the video data bitstream into video performance signals at a video frame rate, the video frame rate being slower than the vertical sync rate so that the audio/video synchrony monitoring and restoring routines include a routine for displaying a selected number of video data bitstream data frames for each video performance signal frame;

the audio/video synchrony monitoring routine includes a routine for determining whether the audio performance signal leads the video performance signal or the audio performance signal lags behind the video performance signal; and the audio/video synchrony restoring routine includes:

a routine for displaying a fewer number of the plurality of video data bitstream data frames for each video performance signal frame when the video performance signal lags behind the audio performance signal; and a routine for displaying a larger number of the plurality of video data bitstream data frames for each video performance signal frame when the video performance signal leads the audio performance signal.

8. A method of synchronizing audio and video presentation signals in a multiprocessor multimedia system comprising:

supplying a video data bitstream and an audio data bitstream;

formatting the video data bitstream for display including:
   supplying a first timing signal for formatting the video data bitstream;
   receiving the video data bitstream;
   converting the video data bitstream into video performance signals; and
   transmitting the video performance signals to a video display;

formatting the audio data bitstream for performance including:
   supplying a second timing signal for formatting the audio data bitstream, the second timing signal being supplied having a timing independent from the first timing signal;
   receiving the audio data bitstream;
   converting the audio data bitstream into audio performance signals, and
   transmitting the audio performance signals to an audio speaker;

determining whether the audio performance signals are asynchronous to the video performance signals; and restoring audio/video synchrony when the audio performance signals are asynchronous to the video performance signals.

9. A method according to claim 8 further comprising:
generating an audio end of process (aEOP) signal upon transmitting the audio performance signals;
generating a video end of process (vEOP) signal upon transmitting the video performance signals;
counting the relative number of aEOP and vEOP signals to detect when the audio performance signals are asynchronous to the video performance signals.

10. A method according to claim 9 further comprising:
comparing the count of aEOP signals received to an expected number of aEOP signals after receipt of a predefined number of vEOP signals are received.

11. A method according to claim 9 further comprising:
determining whether the audio performance signal leads the video performance signal or the audio performance signal lags behind the video performance signal; and
restoring audio/video synchrony including:
   discarding samples from the audio performance signal when the audio performance signal lags behind the video performance signal; and
   adding samples to the audio performance signal when the audio performance signal leads the video performance signal.

12. A method according to claim 11 further comprising:
discarding samples from the audio performance signal when the audio performance signal lags behind the video performance signal implements a discarding technique selected from among the techniques of:
   discarding samples evenly dispersed throughout the audio data bitstream;
   discarding samples dispersed at random in the audio data bitstream; and
   discarding samples having an amplitude lower than a preselected threshold amplitude.

13. A method according to claim 11 further comprising:
adding samples to the audio performance signal when the audio performance signal leads the video performance signal implements an adding technique selected from among the techniques of:
   interpolating samples in the audio data bitstream; and
   duplicating samples in the audio data bitstream.

14. A method according to claim 9 further comprising:
receiving the video data bitstream at a vertical sync rate;
converting the video data bitstream into video performance signals at a video frame rate, the video frame rate being slower than the vertical sync rate, further including:
   displaying a plurality of video data bitstream data frames for each video performance signal frame;
determining whether the audio performance signal leads the video performance signal or the audio performance signal lags behind the video performance signal;
displaying a fewer number of the plurality of video data bitstream data frames for each video performance signal frame when the video performance signal lags behind the audio performance signal; and
displaying a larger number of the plurality of video data bitstream data frames for each video performance signal frame when the video performance signal leads the audio performance signal.

15. A multimedia system comprising:
a data source for supplying a video data bitstream and an audio data bitstream;
a video signal interface coupled to the data source for receiving the video data bitstream, converting the video data bitstream into video performance signals, and transmitting the video performance signals to a video display, the video signal interface having a first timing signal source;
an audio signal interface coupled to the data source for receiving the audio data bitstream, converting the audio data bitstream into audio performance signals, and transmitting the audio performance signals to an audio speaker, the audio signal interface having a second timing signal source having a timing independent from the first timing signal source;
a controller coupled to the video signal interface, the audio signal interface, and the data source, the controller including a means for synchronizing audio and video presentation signals, the synchronizing means including:
   means for monitoring audio/video synchrony;
   means for determining whether the audio performance signals are asynchronous to the video performance signals; and
   means for restoring audio/video synchrony operative when the audio performance signals are asynchronous to the video performance signals.

16. A multimedia system according to claim 15 wherein:
the audio signal interface includes means for generating an audio end of process (aEOP) signal upon transmitting the audio performance signals;
the video signal interface includes means for generating a video end of process (vEOP) signal upon transmitting the video performance signals;
the audio/video synchrony monitoring means includes means for counting the relative number of aEOP and vEOP signals to detect when the audio performance signals are asynchronous to the video performance signals.

17. A multimedia system according to claim 16 wherein:
the audio/video synchrony monitoring means includes an asynchrony detection means for comparing the count of aEOP signals received to an expected number of aEOP signals after receipt of a predefined number of vEOP signals are received.

18. A multimedia system according to claim 16 wherein:

the audio/video synchrony monitoring means includes means for determining whether the audio performance signal leads the video performance signal or the audio performance signal lags behind the video performance signal; and the audio/video synchrony restoring means includes:
  means for discarding samples from the audio performance signal when the audio performance signal lags behind the video performance signal; and
  means for adding samples to the audio performance signal when the audio performance signal leads the video performance signal.

19. A multimedia system according to claim 18 wherein:

the means for discarding samples from the audio performance signal when the audio performance signal lags behind the video performance signal implements a discarding technique selected from among the techniques of:
  discarding samples evenly dispersed throughout the audio data bitstream;
  discarding samples dispersed at random in the audio data bitstream; and
  discarding samples having an amplitude lower than a preselected threshold amplitude.

20. A multimedia system according to claim 18 wherein:

the means for adding samples to the audio performance signal when the audio performance signal leads the video performance signal implements an adding technique selected from among the techniques of: interpolating samples in the audio data bitstream; and duplicating samples in the audio data bitstream.

21. A multimedia system according to claim 16 wherein:

the audio/video synchrony monitoring and restoring routines include a routine for receiving the video data bitstream at a vertical sync rate and converting the video data bitstream into video performance signals at a video frame rate, the video frame rate being slower than the vertical sync rate so that the audio/video synchrony monitoring and restoring routines include a routine for displaying a selected number of video data bitstream data frames for each video performance signal frame;

the audio/video synchrony monitoring routine includes a routine for determining whether the audio performance signal leads the video performance signal or the audio performance signal lags behind the video performance signal; and the audio/video synchrony restoring routine includes:
  a routine for displaying a fewer number of the plurality of video data bitstream data frames for each video performance signal frame when the video performance signal lags behind the audio performance signal; and
  a routine for displaying a larger number of the plurality of video data bitstream data frames for each video performance signal frame when the video performance signal leads the audio performance signal.

22. A method of providing an apparatus for synchronizing audio and video presentation signals in a multiprocessor multimedia system comprising:

providing a data source for supplying a video data bitstream and an audio data bitstream;

providing a video signal interface coupled to the data source for receiving the video data bitstream, converting the video data bitstream into video performance signals, and transmitting the video performance signals to a video display, the video signal interface having a first timing signal source;

providing an audio signal interface coupled to the data source for receiving the audio data bitstream, converting the audio data bitstream into audio performance signals, and transmitting the audio performance signals to an audio speaker, the audio signal interface having a second timing signal source having a timing independent from the first timing signal source;

providing a controller coupled to the video signal interface, the audio signal interface, and the data source, the controller having a program code including:
  an audio/video synchrony monitoring routine for determining whether the audio performance signals are asynchronous to the video performance signals; and
  an audio/video synchrony restoring routine operative when the audio performance signals are asynchronous to the video performance signals.

* * * * *